US007928630B2

(12) United States Patent
Walitzki

(10) Patent No.: US 7,928,630 B2
(45) Date of Patent: Apr. 19, 2011

(54) MONOLITHIC THERMIONIC CONVERTER

(75) Inventor: Hans Juergen Walitzki, Portland, OR (US)

(73) Assignee: Borealis Technical Limited (GI)

( * ) Notice: Subject to any disclaimer, the term of this patent is extended or adjusted under 35 U.S.C. 154(b) by 279 days.

(21) Appl. No.: 12/284,772

(22) Filed: Sep. 24, 2008

(65) Prior Publication Data

US 2009/0079297 A1 Mar. 26, 2009

Related U.S. Application Data

(60) Provisional application No. 60/995,000, filed on Sep. 24, 2007.

(51) Int. Cl.
*H02N 3/00* (2006.01)

(52) U.S. Cl. .......... 310/306

(58) Field of Classification Search .......... 310/306; 322/2 R; 136/205
See application file for complete search history.

(56) References Cited

U.S. PATENT DOCUMENTS

| | | | | | |
|---|---|---|---|---|---|
| 2,915,652 | A | * | 12/1959 | Joseph et al. | 310/306 |
| 3,041,481 | A | * | 6/1962 | Peters, Jr. et al. | 310/306 |
| 3,169,200 | A | | 2/1965 | Huffman et al. | |
| 4,712,039 | A | * | 12/1987 | Hong | 313/307 |
| 5,722,242 | A | * | 3/1998 | Edelson | 62/3.1 |
| 6,064,137 | A | * | 5/2000 | Cox | 310/306 |
| 6,117,344 | A | | 9/2000 | Cox et al. | |
| 6,229,083 | B1 | * | 5/2001 | Edelson | 136/201 |
| 6,281,514 | B1 | | 8/2001 | Tavkhelidze | |
| 6,495,843 | B1 | | 12/2002 | Tavkelidze | |
| 6,531,703 | B1 | * | 3/2003 | Tavkhelidze | 250/493.1 |
| 6,680,214 | B1 | | 1/2004 | Tavkhelidze et al. | |
| 7,557,487 | B2 | * | 7/2009 | Tanielian | 310/306 |
| 2005/0147841 | A1 | * | 7/2005 | Tavkhelidze et al. | 428/687 |
| 2006/0006515 | A1 | * | 1/2006 | Cox | 257/684 |
| 2007/0013055 | A1 | * | 1/2007 | Walitzki | 257/717 |
| 2009/0079297 | A1 | * | 3/2009 | Walitzki | 310/306 |
| 2009/0127549 | A1 | * | 5/2009 | Walitzki | 257/43 |

FOREIGN PATENT DOCUMENTS

| | | | |
|---|---|---|---|
| WO | 9947980 | A1 | 9/1999 |
| WO | 03083177 | A2 | 10/2003 |
| WO | 03090245 | A1 | 10/2003 |

* cited by examiner

*Primary Examiner* — Karl I Tamai

(57) ABSTRACT

A thermionic converter is disclosed comprising a single or multiple hot (emitter) and cold (collector) electrodes mounted side-by-side on a single substrate and a static electrostatic field for guiding electron from the emitter to the collector. The thermal path between emitter and collector electrodes is interrupted by cuts or trenches, and electrical connections to the electrodes are routed over a meander-like, high thermal resistance pathway cut into the substrate to further reduce thermal loss. In one embodiment, there is an Avto metal surface texture of nanoscale indents on one or more of the electrodes to lower a work function. A method for fabricating the monolithic thermionic converter is further disclosed.

20 Claims, 7 Drawing Sheets

MONOLITHIC THERMIONIC CONVERTER

CROSS-REFERENCE TO RELATED APPLICATIONS

The present application claims the benefit of Provisional Application No. 60/995,000 filed 24 Sep. 2007, which application is included herein by reference.

BACKGROUND OF THE INVENTION

In the prototypical thermionic converter depicted in FIG. 1, a hot electrode 1 and a cold electrode 2 are mounted in parallel, facing one another. The hot electrode is connected to a heat reservoir through a hot finger or heat pipe 4, and the cold electrode is connected to a cold reservoir through a cold finger or heat pipe 5. At temperatures above 500 degrees Celsius, this can lead to considerable parasitic radiation losses if the reflectivity of either or both electrodes is much smaller than 100%. Furthermore, spacers 3 may be used to maintain the gap between the electrodes, increasing heat loss. The size of the gap is determined by engineering design considerations. A large gap of several hundred microns is relatively simple to manufacture and control, but requires additional means to reduce space charge effects. Also as a result of a large gap, positively charged ions form a neutral plasma with the emitted electrons, thereby preventing additional electrons from being repelled by a space charge. A smaller gap of less than a few micrometers reduces space charge issues but is difficult to maintain over the operating temperature range of the device. Further, if multiple devices 10 are combined in one module, the heat conduction through the electrical conductors 11 between the hot and cold sides of adjacent devices can also be a considerable loss factor. (FIG. 2)

In U.S. Pat. No. 3,169,200, a multilayer converter is described which comprises two electrodes, intermediate elements and oxide spacers disposed between each adjacent element. A thermal gradient is maintained across the device, and opposite faces on each of the elements serve as emitter and collector. Electrons tunnel through each oxide barrier to a cooler collector, thereby generating a current flow through a load connected to the two electrodes. One drawback is that the device must contain some 10.6 elements in order to provide reasonable efficiency, and this is difficult to manufacture. A further drawback results from the losses due to thermal conduction: although the oxide spacers have a small contact coefficient with the emitter and collector elements, which minimizes thermal conduction, the number of elements required for the operation of the device means that thermal conduction is not insignificant.

A further issue that arises with gap diodes is parasitic heat loss. Although a vacuum gap by itself is a perfect insulator, heat may flow from the hot side to the cold side through the spacers and the edge seals. Even if a material with low thermal conductivity is chosen for spacers and edge seals, the heat losses can be substantial if the substrates are chosen from a metal or semiconductor material due to the fact that the spacers and seals are very thin.

In WO03090245, a gap diode is disclosed in which a tubular actuating element serves as both housing for a pair of electrodes and as a means for controlling the separation between the electrode pair. In a preferred embodiment, the tubular actuating element is a quartz piezo-electric tube. In accordance with another embodiment of the present invention, a gap diode is disclosed which is fabricated by micromachining techniques in which the separation of the electrodes is controlled by piezo-electric, electrostrictive or magnetostrictive actuators. Preferred embodiments of gap diodes include Cool Chips, Power Chips, and photoelectric converters.

However, active elements such as piezo actuators may be complicated and costly, and thus the simplicity of a layered structure to provide separation of electrodes is desirable.

U.S. Pat. Nos. 2,915,652 and 3,041,481 describe thermionic converters in which the emitter and collector are arranged in a novel arrangement and which also comprise the addition of electric and magnetic fields so as to provide improved converter efficiency and functioning. The emitter and collector are arranged side by side and a third electrode is positioned above and facing the emitter and collector. A transverse magnetic field, in addition to the electric field provided by the third electrode curves and directs the emitted electrons to the collector. This arrangement counters the effects of space charge and minimizes the transfer of heat between the emitter and collector, thereby increasing efficiency. However, the abovementioned patents disclose no method for constructing such potentially valuable devices. Furthermore, such arrangements would be difficult to construct in a manner similar to a vacuum tube due to the relatively large thermal gradients within the device and during start up and shut down.

Avto Metals:

In what follows, "Avto Metals" is to be understood as a metal film having a modified shape, which alters the electronic energy levels inside the modified electrode, leading to a decrease in electron work function as described in the foregoing, and illustrated in FIG. 3 below.

In U.S. Pat. Nos. 6,281,514, 6,531,703 and 6,495,843 and WO9940628, a method is disclosed for promoting the passage of elementary particles at or through a potential barrier comprising providing a potential barrier having a geometrical shape for causing de Broglie interference between the elementary particles. In another embodiment, the invention provides an elementary particle-emitting surface having a series of indents. The depth of the indents is chosen so that the probability wave of the elementary particle reflected from the bottom of the indent interferes destructively with the probability wave of the elementary particle reflected from the surface. This results in the increase of tunneling through the potential barrier. When the elementary particle is an electron, electrons tunnel through the potential barrier, thereby leading to a reduction in the effective work function of the surface. In further embodiments, the invention provides vacuum diode devices, including a vacuum diode heat pump, a thermionic converter and a photoelectric converter, in which either or both of the electrodes in these devices utilize the elementary particle-emitting surface. In yet further embodiments, the invention provides devices in which the separation of the surfaces in such devices is controlled by piezo-electric positioning elements. A further embodiment provides a method for making an elementary particle-emitting surface having a series of indents.

In U.S. Pat. No. 6,117,344 and WO9947980, methods are described for fabricating nano-structured surfaces having geometries in which the passage of elementary particles through a potential barrier is enhanced. The methods use combinations of electron beam lithography, lift-off, and rolling, imprinting or stamping processes.

In U.S. Pat. No. 6,680,214, a method is disclosed for the induction of a suitable band gap and electron emissive properties into a substance, in which the substrate is provided with a surface structure corresponding to the interference of electron waves. Lithographic or similar techniques are used, either directly onto a metal mounted on the substrate, or onto a mold which then is used to impress the metal. In a preferred embodiment, a trench or series of nano-sized trenches are formed in the metal.

In WO03/083177, the use of electrodes having a modified shape and a method of etching a patterned indent onto the surface of a modified electrode, which modifies the electronic energy levels inside the modified electrode, leading to a decrease in electron work function is disclosed. The method comprises creating an indented or protruded structure on the surface of a metal. The depth of the indents or height of protrusions is equal to $\alpha$, and the thickness of the metal is $Lx+\alpha$. The minimum value for $\alpha$ is chosen to be greater than the surface roughness of the metal. Preferably the value of $\alpha$ is chosen to be equal to or less than Lx/5. The width of the indentations or protrusions is chosen to be at least 2 times the value of $\alpha$. Typically the depth of the indents is $=\lambda/2$, wherein $\lambda$ is the de Broglie wavelength, and the depth is greater than the surface roughness of the metal surface. Typically the width of the indents is $>>\lambda$, wherein $\lambda$ is the de Broglie wavelength. Typically the thickness of the indents is a multiple of the depth, preferably between 5 and 15 times the depth, and preferably in the range 15 to 75 nm. FIG. 3 shows the shape and dimensions of a modified electrode having a thin metal film 40 on a substrate 42. Indent 44 has a width b and a depth a relative to the height of metal film 40. Film 40 comprises a metal whose surface should be as planar as possible as surface roughness leads to the scattering of de Broglie waves. Metal film 40 is given sharply defined geometric patterns or indent 44 of a dimension that creates a de Broglie wave interference pattern that leads to a decrease in the electron work function, thus facilitating the emissions of electrons from the surface and promoting the transfer of elementary particles across a potential barrier. The surface configuration of the modified electrode may resemble a corrugated pattern of squared-off, "u"-shaped ridges and/or valleys. Alternatively, the pattern may be a regular pattern of rectangular "plateaus" or "holes," where the pattern resembles a checkerboard. The walls of indent 44 should be substantially perpendicular to one another, and its edges should be substantially sharp. The surface configuration comprises a substantially planar slab of a material having on one surface one or more indents of a depth approximately 5 to 20 times a roughness of the surface and a width approximately 5 to 15 times the depth. The walls of the indents are substantially perpendicular to one another, and the edges of the indents are substantially sharp.

BRIEF SUMMARY OF THE INVENTION

From the foregoing, it may be appreciated that a need has arisen for a thermionic device that can operate at lower temperatures and with lower parasitic losses than current devices. It is the intention of this invention to provide a thermionic converter having these qualities.

The present invention is directed towards a thermionic converter in which the hot and cold electrodes are placed side by side onto a single substrate, preferably a die from ceramic, glass, or a semiconductor material wafer. The chemical composition of the emitter and collector is engineered to provide a substantial electron emission current at the desired temperature. For a high efficiency converter, the collector work function must be lower than the emitter work function since the output voltage is approximately the difference in work function potential. In one preferred embodiment, the collector electrode is made from the same material as the emitter electrode having the addition of an Avto Metal pattern of nano-sized indents, as described above, so as to lower the work function. The present invention further maintains that the die is cut through to reduce the thermal losses between the hot and cold side. Another component of the present invention is a meander-like path cut to allow the required electrical connections to the electrodes while minimizing conductive heat losses. Electrons are guided from the emitter to the collector by means of static electromagnetic fields. In one embodiment, electrostatic control electrodes are constructed to match the size and shape of the underlying electrodes and are arranged above and facing the emitter and collector electrodes.

A first advantage of this present invention is a device having a lower parasitic losses and lower operation temperatures as compared to prior art devices. These advantages further include reduced radiative heat transfer, less heat transferred through electrical connections, fewer and simpler serial connections and no space charge effect.

Another advantage of this invention is the ability to have multiple emitter and collector electrodes fabricated and connected on a single die, thereby simplifying the device and rendering it relatively inexpensive to construct.

A further advantage of the present invention is its compatibility with Avto Metals, thereby providing the most efficient and cost effective choice of materials for the electrodes.

Another advantage of the present invention is the potential for mass manufacturing with standard semiconductor fabrication processes at low costs, due to the monolithic structure of the converter. Similarly, a multiplicity of identical devices can be manufactured on a larger wafer and later be separated by dicing or laser cutting to form individual devices.

BRIEF DESCRIPTION OF THE SEVERAL VIEWS OF THE DRAWING

For a more complete explanation of the present invention and the technical advantages thereof, reference is now made to the following description and the accompanying drawings, in which.

DETAILED DESCRIPTION OF THE INVENTION

Figure 1:
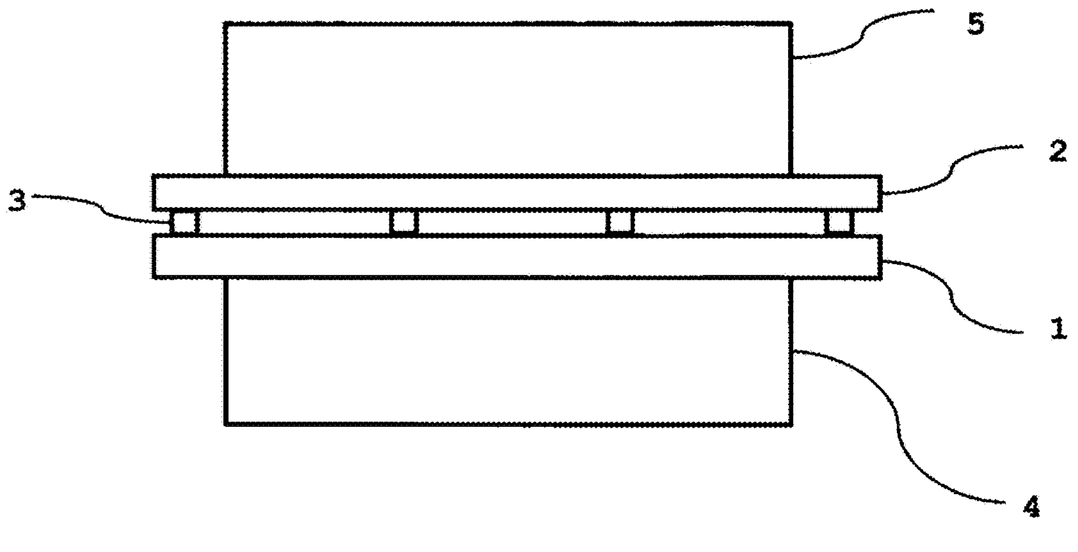
Figure 1 (Prior Art)
FIG. 1 shows a prior art thermionic converter in which the electrodes are arranged in a parallel configuration, having surfaces facing one another.
Figure 2:
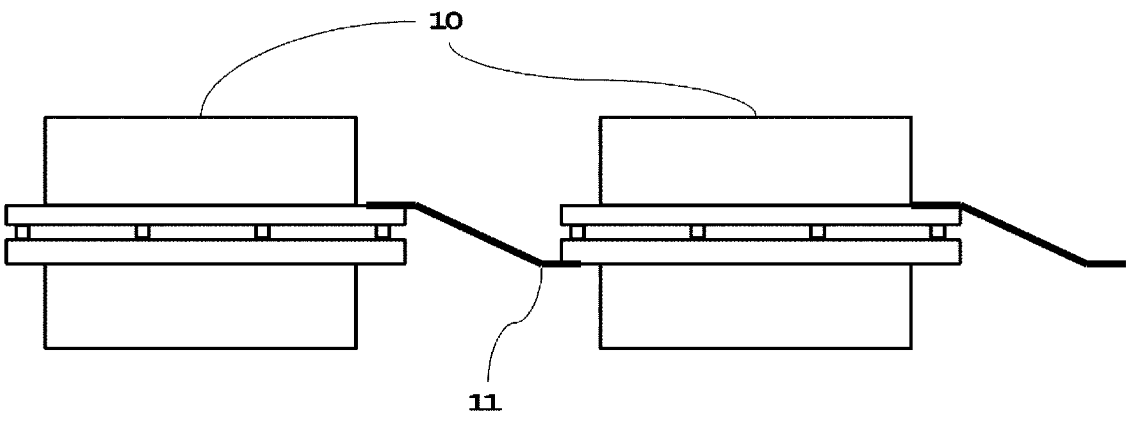
Figure 2 (Prior Art)
FIG. 2 shows two of the devices displayed in FIG. 1 combined in one module.
Figure 3:
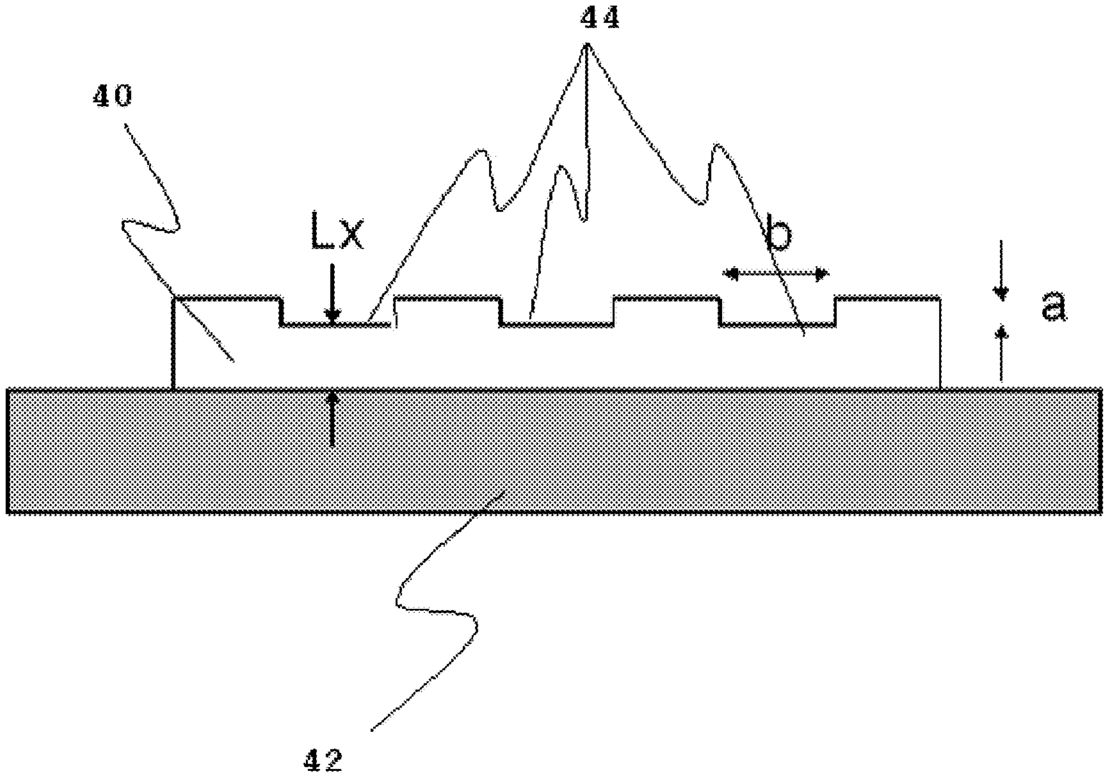
Figure 3 (Prior Art)
FIG. 3 shows a diagrammatic representation of a prior art metal film having a modified shape, which alters the electronic energy levels inside the modified electrode, leading to a decrease in electron work function.
Figure 4:
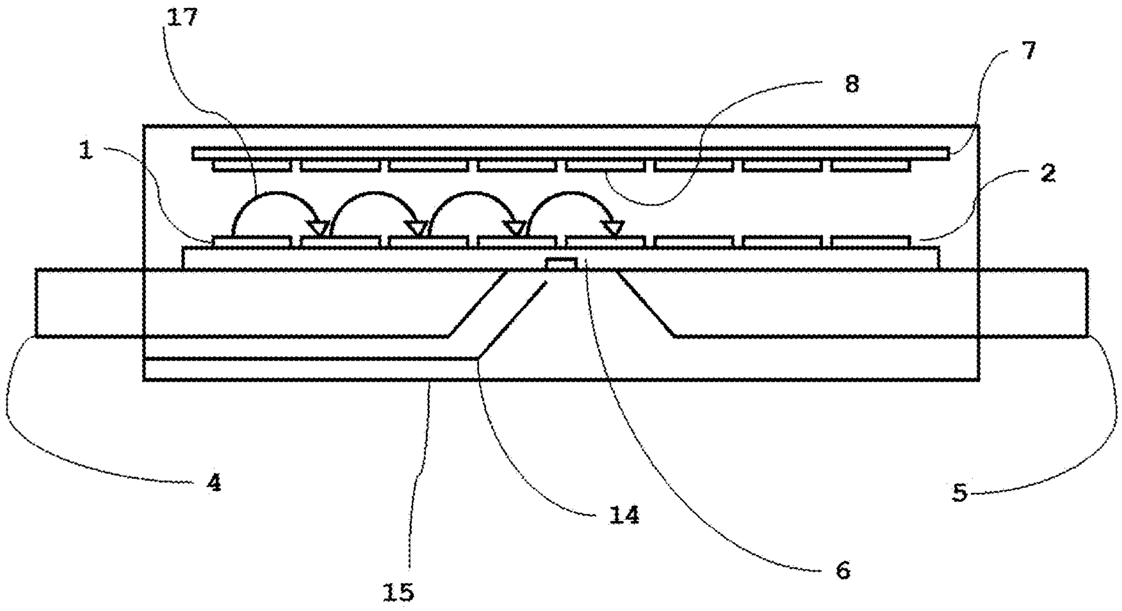
FIG. 4 is a side view of the present invention.

Embodiments of the present invention and their technical advantages may be better understood by referring to FIG. 4. FIG. 4 depicts one embodiment of the present invention, in which one or more hot electrodes 1 and cold electrodes 2 are deposited in a side-by-side configuration on a single die of the surface of a wafer 6 by sputtering, chemical vapor deposition, or other suitable method. The surface of wafer 6 is flat, plane, and smooth. Means are provided for creating a static electromagnetic field (not shown), which may be any means known in the art. Wafer 6 may be any of the following; a ceramic or a glass wafer, or a semiconductor wafer with an electrically insulating surface film. The shape of hot electrodes 1 and cold electrodes 2 is controlled by masks or other known methods such as photolithography or screen printing. The chemical composition of the emitter and collector is engineered to provide a substantial electron emission current at the desired temperature. For example, a converter operating at 500 degrees Celsius requires a work function of approximately 1 eV. For a high efficiency converter, the collector work function must be lower than the emitter work function since the output voltage is approximately the difference in work function potential. In a preferred embodiment, this is achieved by making the collector electrodes from the same material as the emitter electrodes while applying the method as described in the abovementioned Avto Metal patents. The method comprises creating an indented or protruded structure on the surface of a metal. The depth of the indents or height of protrusions is equal to a, and the thickness of the metal is $Lx+\alpha$. The minimum value for a is chosen to be greater than the surface roughness of the metal. Preferably the value of $\alpha$ is chosen to be equal to or less than $Lx/5$. The width of the indentations or protrusions is chosen to be at least 2 times the value of $\alpha$. Typically the depth of the indents is $=\lambda/2$, wherein $\lambda$ is the de Broglie wavelength, and the depth is greater than the surface roughness of the metal surface. Typically the width of the indents is $>>\lambda$, wherein $\lambda$ is the de Broglie wavelength. Typically the thickness of the indents is a multiple of the depth, preferably between 5 and 15 times the depth, and preferably in the range 15 to 75 nm. FIG. 3 shows the shape and dimensions of a modified electrode having a thin metal film 40 on a substrate 42. Indent 44 has a width b and a depth a relative to the height of metal film 40. Film 40 comprises a metal whose surface should be as planar as possible as surface roughness leads to the scattering of de Broglie waves. Metal film 40 is given sharply defined geometric patterns or indent 44 of a dimension that creates a de Broglie wave interference pattern that leads to a decrease in the electron work function, thus facilitating the emissions of electrons from the surface and promoting the transfer of elementary particles across a potential barrier. The surface configuration of the modified electrode may resemble a corrugated pattern of squared-off, "u"-shaped ridges and/or valleys. Alternatively, the pattern may be a regular pattern of rectangular "plateaus" or "holes," where the pattern resembles a checkerboard. The walls of indent 44 should be substantially perpendicular to one another, and its edges should be substantially sharp. The surface configuration comprises a substantially planar slab of a material having on one surface one or more indents of a depth approximately 5 to 20 times a roughness of the surface and a width approximately 5 to 15 times the depth. The walls of the indents are substantially perpendicular to one another, and the edges of the indents are substantially sharp. The patterned indents of the Avto Metal texture effectively lower the collector electrode work function substantially. In another embodiment, an Avto metal structure is provided on the emitter electrode, and in an even further embodiment, an Avto metal structure is provided on both the emitter and collector electrodes, by which the electrical properties of both electrodes can be customized to provide the precise required voltage output and by which a wide variety of materials become available for both electrodes. Alternatively, neither of the emitter and collector is provided with an Avto metal surface texture.

Referring back to FIG. 4, electrical connections 13 (not shown, see FIG. 5) to the electrodes are further deposited onto the wafer through pvd, cvd, or any other suitable method. Hot and cold fingers, or heat pipes, 4 and 5 lie beneath hot electrodes 1 and cold electrodes 2, respectively, and are formed using techniques common in the manufacture of integrated circuits. Electrons 17 are emitted from emitter electrodes 1 and are guided towards collector electrodes 2 by electrostatic control electrodes 8 that are situated on substrate 7. Preferably, the control electrodes are substantially the same size and shape as the emitter and collector electrodes. An additional magnetic field may be applied in conjunction with that created by the applied voltage of the control electrodes. The fields together direct emitted electrons from the emitter to the collector. In one embodiment, a second radiation shield 14 beneath the hot electrode may aid in minimizing radiation losses from the hot electrode. Such a shield is electrically isolated and will overtime become negatively charged by stray electrons, and will thus redirect further stray electrons towards the collector electrodes, further improving the efficiency of the device.

Figure 5:
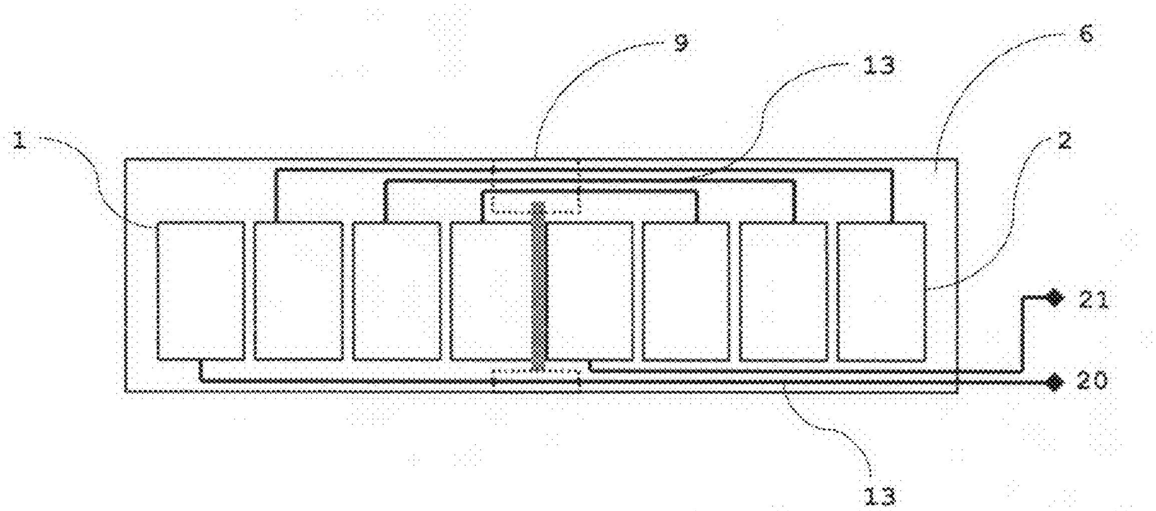
FIG. 5 is a top view of one embodiment of the present invention.
Figure 6:
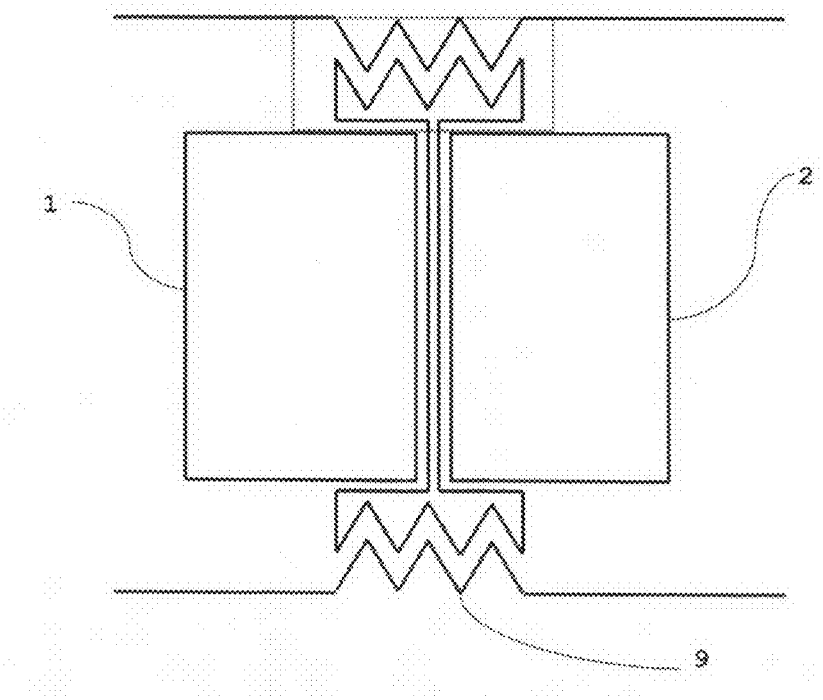
FIG. 6 is a close-up view displaying a meander-like path cut in the wafer.

FIG. 5 displays a top-view of the embodiment displayed in FIG. 4. Visible in FIG. 5 is a cut in the die 6 at location 9, whose purpose is to reduce the thermal losses between the hot and cold sides of the device. Cut/trench 9 is cut through the die, preferably by laser cutting, though any other known method is also included within the scope of the invention, and interrupts the thermal paths between the hot and cold electrodes 1 and 2. Also visible in FIG. 5 are conductors 13 connecting the electrodes that have been deposited onto wafer 6 through the use of pvd, cvd, or any other suitable method. Cut/trench 9 may be cut in a meander-like path, or an additional meander-like structure may be cut through, to allow the required electrical connections to the electrodes while minimizing conductive heat losses, as is shown in FIG. 6. A further benefit of the meander-like path is that all wire connections to outside terminals are only one the cold side of the device. Another function of this meander-like path is to allow for differences in thermal expansion between the hot and cold sides without putting undue stress onto the entire device. Electrical power is provided by the generator through electric terminals 20 and 21.

Figure 7:
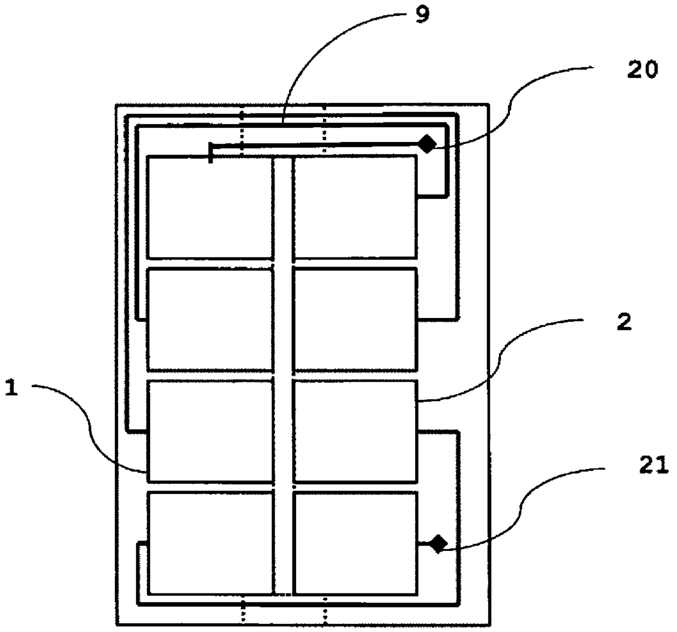
FIG. 7 is a top view of another embodiment of the present invention.

While the device of the present invention may comprise just one hot electrode 1 and one cold electrode 2, in the embodiment displayed in FIG. 5 multiple electrodes are connected to create a series connection of hot and cold electrode pairs, thereby increasing the voltage obtainable form the device by a factor N, wherein N is the number of series connections. FIG. 7 displays a further arrangement of electrodes 1 and 2. Through FIGS. 5 and 7 the advantage of a monolithic design becomes obvious in that all electrical connections are integrated onto the chip and only few electrical connections are made to outside terminals.

Figure 8:
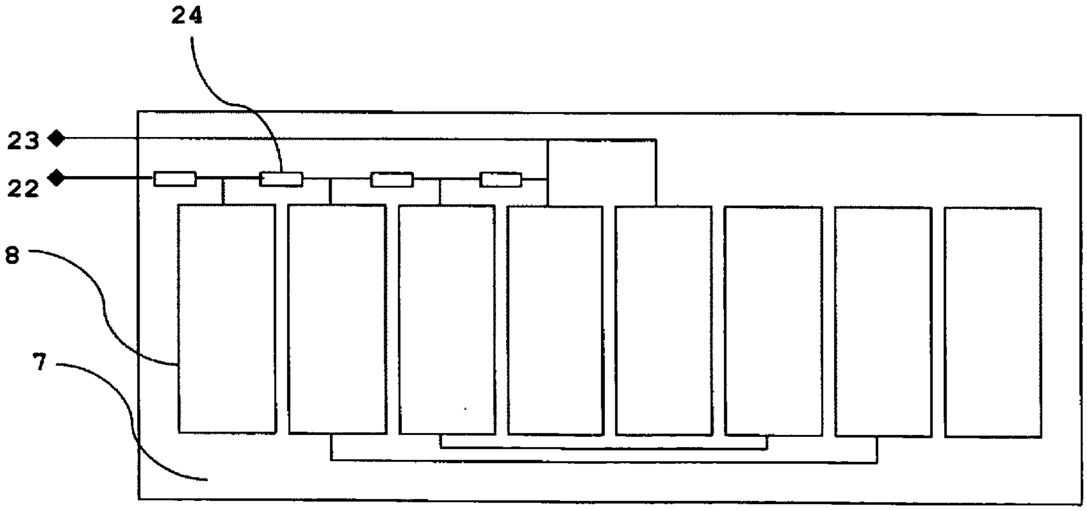
FIG. 8 displays the electrostatic control electrode configuration.

FIG. 8 displays substrate 7 upon which electrostatic control electrodes 8 are deposited through sputtering, cvd, screen-printing, or other suitable method. Masks are used to determine the shape. In one embodiment, the size and shape of one or multiple electrostatic control electrodes 8 matches the size and shape of the underlying emitter and collector electrodes. Electrodes 8 are connected through conductors to a secondary power supply (not shown) thereby providing the required acceleration voltage. Voltage dividers 24 are connected to the secondary power supply through terminals 22 and 23. In the case where more than one voltage is required, a resistor network or DC-DC converters can be integrated onto the substrate 7. Electrodes 8 can be comprised of any conductive film. However, is it preferable that the film provide a reflectivity of close to 100% to minimize radiation losses from the hot electrode. Additionally, a second radiation shield 14 (not shown, see FIG. 4) beneath the hot electrode may serve the abovementioned purpose. Such a shield is electrically isolated and will overtime become negatively charged by stray electrons, and will thus redirect further stray electrons towards the collector electrodes, further improving the efficiency of the device.

Figure 9:
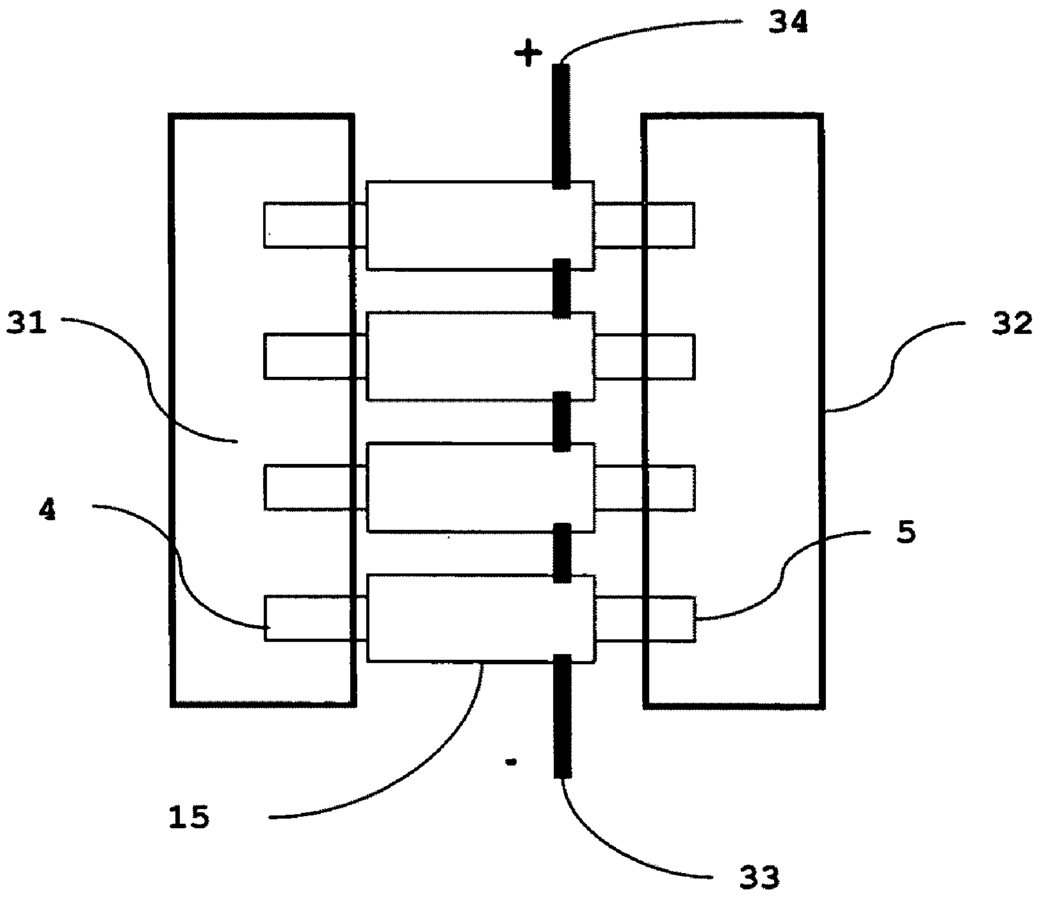
FIG. 9 displays a configuration in which multiple modules can be connected in a series.

One primary benefit of this inventive method is that all electrodes are electrically isolated from the vacuum enclosure and the heat or cold fingers or heat pipes. Therefore, multiple modules 15 may be easily configured in a series connection to obtain the desired output voltage, as displayed in FIG. 9. Here the main power lines are shown as 33 and 34 while the heat source is identified as 31 and the heat sink (or cooling loop) is marked as 32.

Although particular embodiments of the invention have been described in detail for purposes of illustration, various modifications may be made without departing from the spirit and scope of the invention.

The invention claimed is:

1. A thermionic converter, comprising:

a) a single die of a wafer;

b) one or more hot emitter electrodes;

c) one or more cold collector electrodes;

d) electrical connections to said electrodes; and e) at least one electrostatic control electrode;

wherein said hot and cold electrodes are arranged on the surface of said single die in a side-by-side configuration; wherein, in use, electrons are guided from said emitter to said collector by a field created by a voltage applied to said electrostatic control electrode; and wherein said electrical connections to said one or more emitter electrodes are routed over a meander-like thermal pathway to said one or more collector electrodes, whereby said connections can be connected to outside terminals with no additional thermal losses.

2. The converter of claim 1, wherein said electrodes are made using a deposition method selected from the group consisting of: PVD, CVD.

3. The converter of claim 1, wherein a thermal path between said hot and cold electrodes is interrupted by cuts or trenches.

4. The converter of claim 1, wherein electrical connections to said electrodes are deposited on said die by PVD or CVD.

5. The converter of claim 1, wherein said one or more cold electrodes are made from a material that has a lower work function than the material from which said one or more hot electrodes are made.

6. The converter of claim 5, wherein said emitter and collector are made from a material having a low work function, and wherein the material of said collector has a nanoscale surface texture.

7. The converter of claim 1, wherein said emitter has a nanoscale surface texture and wherein said collector electrode is coated with a film that has a lower work function than said emitter.

8. The converter of claim 1, wherein neither said emitter nor said collector electrodes have a nanoscale textured surface and wherein the required work functions are established by selecting the appropriate film composition.

9. The converter of claim 6, wherein said nanoscale surface texture is comprised of a series of indents on the scale of the de Broglie wavelength.

10. The converter of claim 9, wherein said indents have walls that are substantially perpendicular to one another and wherein said indents have walls that are substantially sharp.

11. The converter of claim 9, wherein the depth of said indents is approximately to 20 times a roughness of said surface and wherein the width of said indents is approximately 5 to 15 times said depth.

12. The converter of claim 7, wherein said nanoscale surface texture is comprised of a series of indents on the scale of the de Broglie wavelength.

13. The converter of claim 12, wherein said indents have walls that are substantially perpendicular to one another and wherein said indents have walls that are substantially sharp.

14. The converter of claim 12, wherein the depth of said indents is approximately to 20 times a roughness of said surface and wherein the width of said indents is approximately 5 to 15 times said depth.

15. The converter of claim 1, further comprising at least one electrostatic control electrode, wherein said electrostatic control electrodes are made by depositing a conducting film onto a substrate providing a reflectivity of >90%.

16. The converter of claim 1, further comprising a radiation shield beneath said hot electrode.

17. The converter of claim 13, wherein the size and shape of said electrostatic control electrodes is substantially the same as the size and shape of said emitter and collector electrodes.

18. The converter of claim 12, further comprising an additional magnetic field, wherein applied voltages of said electrostatic control electrodes in conjunction with said additional magnetic field directs emitted electrons to said collector electrode.

19. The converter of claim 1, further comprising a heat shield disposed beneath said hot electrode, whereby radiation loss from said hot electrode is minimized.

20. The converter of claim 1, wherein said emitter and collector comprise an Avto metal.

* * * * *